(12) United States Patent
Loh et al.

(10) Patent No.: US 9,697,147 B2
(45) Date of Patent: Jul. 4, 2017

(54) STACKED MEMORY DEVICE WITH METADATA MANAGEMENT

(75) Inventors: Gabriel H. Loh, Bellevue, WA (US); James M. O'Connor, Austin, TX (US); Bradford M. Beckmann, Redmond, WA (US); Michael Ignatowski, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 723 days.

(21) Appl. No.: 13/567,945

(22) Filed: Aug. 6, 2012

(65) Prior Publication Data

US 2014/0040698 A1     Feb. 6, 2014

(51) Int. Cl.
H03M 13/00 (2006.01)
G06F 13/16 (2006.01)
G06F 11/10 (2006.01)

(52) U.S. Cl.
CPC ...... *G06F 13/1668* (2013.01); *G06F 11/1004* (2013.01); *Y02B 60/1228* (2013.01)

(58) Field of Classification Search
CPC .................. G06F 13/1668; G06F 11/1004
USPC .......................................... 714/758; 711/105
See application file for complete search history.

(56) References Cited

U.S. PATENT DOCUMENTS

| | | |
|---|---|---|
| 5,391,917 A | 2/1995 | Gilmour et al. |
| 6,189,065 B1 | 2/2001 | Arndt et al. |
| 6,519,674 B1 | 2/2003 | Lam et al. |
| 7,477,535 B2 | 1/2009 | Lahtinen et al. |
| 7,623,365 B2 | 11/2009 | Jeddeloh |
| 7,796,446 B2 | 9/2010 | Ruckerbauer et al. |
| 7,894,229 B2 | 2/2011 | Lahtinen |
| 7,930,446 B2 | 4/2011 | Kesselman et al. |
| 7,930,661 B1 | 4/2011 | Trimberger et al. |
| 8,064,739 B2 | 11/2011 | Blinkert et al. |
| 8,127,185 B2 | 2/2012 | Jeddeloh |
| 8,233,303 B2 | 7/2012 | Best et al. |
| 8,356,138 B1 | 1/2013 | Kulkarni et al. |
| 8,423,789 B1 | 4/2013 | Poo et al. |
| 8,451,014 B2 | 5/2013 | Black et al. |
| 8,519,739 B1 | 8/2013 | Leon |

(Continued)

OTHER PUBLICATIONS

U.S. Appl. No. 13/726,142, filed Dec. 23, 2012, entitled "Die-Stacked Device With Partitioned Multi-Hop Network".

(Continued)

*Primary Examiner* — Sam Rizk

(57) ABSTRACT

A processing system comprises one or more processor devices and other system components coupled to a stacked memory device having a set of stacked memory layers and a set of one or more logic layers. The set of logic layers implements a metadata manager that offloads metadata management from the other system components. The set of logic layers also includes a memory interface coupled to memory cell circuitry implemented in the set of stacked memory layers and coupleable to the devices external to the stacked memory device. The memory interface operates to perform memory accesses for the external devices and for the metadata manager. By virtue of the metadata manager's tight integration with the stacked memory layers, the metadata manager may perform certain memory-intensive metadata management operations more efficiently than could be performed by the external devices.

40 Claims, 8 Drawing Sheets

(56) References Cited

U.S. PATENT DOCUMENTS

| | | | |
|---|---|---|---|
| 8,546,955 B1 | 10/2013 | Wu | |
| 8,700,951 B1* | 4/2014 | Call et al. | 714/6.24 |
| 8,778,734 B2 | 7/2014 | Metsis | |
| 9,064,715 B2 | 6/2015 | Lee et al. | |
| 9,164,147 B2 | 10/2015 | Chi | |
| 9,229,887 B2 | 1/2016 | Jeddeloh | |
| 2004/0148482 A1 | 7/2004 | Grundy | |
| 2004/0153902 A1* | 8/2004 | Machado et al. | 714/710 |
| 2006/0164882 A1 | 7/2006 | Norman | |
| 2008/0066302 A1 | 3/2008 | Chung | |
| 2008/0320346 A1* | 12/2008 | Lin | 714/721 |
| 2009/0017580 A1 | 1/2009 | Smith | |
| 2009/0055596 A1 | 2/2009 | Wallach et al. | |
| 2009/0103345 A1 | 4/2009 | McLaren et al. | |
| 2009/0190404 A1 | 7/2009 | Roohparvar | |
| 2009/0313483 A1 | 12/2009 | Ranade | |
| 2010/0005118 A1 | 1/2010 | Sezer | |
| 2010/0008058 A1 | 1/2010 | Saen et al. | |
| 2010/0070696 A1* | 3/2010 | Blankenship | 711/105 |
| 2010/0070782 A1* | 3/2010 | Majewski et al. | 713/310 |
| 2010/0157644 A1 | 6/2010 | Norman | |
| 2010/0161918 A1 | 6/2010 | Norman | |
| 2010/0167100 A1* | 7/2010 | Moore et al. | 429/33 |
| 2011/0231739 A1 | 9/2011 | Kim | |
| 2012/0023376 A1 | 1/2012 | Jeddeloh | |
| 2012/0079176 A1 | 3/2012 | Sun et al. | |
| 2012/0104578 A1 | 5/2012 | Hu et al. | |
| 2012/0130983 A1 | 5/2012 | Ryan et al. | |
| 2012/0204073 A1 | 8/2012 | Whetsel | |
| 2012/0273782 A1 | 11/2012 | Goel et al. | |
| 2012/0290793 A1 | 11/2012 | Chung et al. | |
| 2013/0007352 A1 | 1/2013 | Maislos | |
| 2013/0031330 A1 | 1/2013 | Jones et al. | |
| 2013/0042060 A1 | 2/2013 | Marukame et al. | |
| 2013/0073755 A1 | 3/2013 | Sadowski et al. | |
| 2013/0073839 A1 | 3/2013 | Hasegawa | |
| 2013/0086353 A1 | 4/2013 | Colgrove et al. | |
| 2013/0257481 A1 | 10/2013 | Metsis | |
| 2013/0292840 A1 | 11/2013 | Shoemaker et al. | |
| 2014/0013169 A1 | 1/2014 | Kobla et al. | |
| 2014/0085959 A1 | 3/2014 | Saraswat et al. | |
| 2014/0108891 A1* | 4/2014 | Strasser et al. | 714/773 |
| 2014/0173113 A1 | 6/2014 | Vemuri et al. | |

OTHER PUBLICATIONS

U.S. Appl. No. 13/726,143, filed Dec. 23, 2012, entitled "Die-Stacked Memory Device Providing Data Translation".
U.S. Appl. No. 13/726,144, filed Dec. 23, 2012, entitled "Quality of Service Support Using Stacked Memory Device With Logic Die".
U.S. Appl. No. 13/726,145, filed Dec. 23, 2012, entitled "Die-Stacked Memory Device With Reconfigurable Logic".
U.S. Appl. No. 13/726,146, filed Dec. 23, 2012, entitled "Cache Coherency Using Die-Stacked Memory Device With Logic Die".
David Patterson et al., "FP 14.1: Intelligent RAM (IRAM): Chips That Remember & Compute", 1997 IEEE International Solid-State Circuits Conference, Feb. 7, 1997, 2 pages.
J. Thomas Pawlowski, "Hybrid Memory Cube (HMC)", Micron Technologies, Aug. 4, 2011, 24 pages.
Intel Platform Brief "Intel Atom Processor E6x5C Series-Based Platform for Embedded Computing", http://newsroom.intel.com/servlet/jiveservlet/download/1512-31-3257/ProductBrief-IntelAtomProcessor_E600C_series_v2.pdf, Jan. 2010, 4 pages.
Stretch, Inc. Configurable Processors, http://www.stretchinc.com, Accessed Apr. 2, 2013, 1 page.
U.S. Appl. No. 13/328,393, filed Dec. 16, 2011, entitled "Memory Architecture for Readmodify-Writeoperations".
U.S. Appl. No. 13/567,958 filed Aug. 6, 2012, entitled "Stacked Memory Device With Helper Processor".
Gabriel H. Loh, "3D-Stacked Memory Architectures for Multi-Core Processors, ISCA '08 Proceedings of the 35th Annual International Symposium on Computer Architecture", Jun. 2008, pp. 453-464.
Nathan Brookwood, "AMD Fusion Family of APUs: Enabling a Superior, Immersive PC Experience", AMD White Paper: AMD Fusion Family of APUs, Mar. 2010, 8 pages.
"How Computers Work: The CPU and Memory", <http://homepage.cs.url.edu/faculty/wolfe/book/Readings/Reading04.htm> Feb. 1, 2002, 1 page.
N.S. Matlo, "Introduction to Microcoded Implementation of a CPU Architecture", <http://www.cs.ucsb.edu/~chong/154/Tan.pdf> Jan. 21, 1997, 12 pages.
Lixin Tao, "Interrupt Processing", <http://csis.pace.edu/~lixin/teaching/cs371/interrupt.pdf> Sep. 2002, 3 pages.
Shawn Hargreaves, "An elf in a box", <http://blogs.msdn.com/b/shawnhar/archive/2008/03/31/an-elf-in-a-box.aspx> Mar. 31, 2008, 5 pages.
Chris Rawson, "Mac 101: Integrated versus discrete graphics", <http://www.tuaw.com/2010/05/14/mac-101-integrated-versus-discrete-graphics/> May 14, 2010, 2 pages.
Matthew Hogan, "Silicon Interposers: building blocks for 3D-Ics", <http://electroiq.com/blog/2011/06/silicon-interposers-building-blocks-for-3d-ics/> Jun. 14, 2011, 6 pages.
Nigel Jacob, "Offloading IDS Computation to the GPU", 22nd Annual Computer Security Applications Conference (ACSAC'06), <http://www.acsac.org/2006/papers/74.pdf> Dec. 21, 2006, 10 pages.
Laura Tiffany, "How Many Computer Processors Do You Need?" <http://www.allbusiness.com/computing-information-technology/parallel-computing/12603535-1/html> Aug. 7, 2009, 2 pages.
QNX "Processes and Threads", <http://www.qnx.com/developers/docs/6.4.0/neutrino/getting_started/s1_procs.html> May 29, 2009, 20 pages.
Eric Chan, "GPU Gems 2" <http://http.developer.nvidia.com/GPUGems2_chapter22.html> Apr. 15, 2005, Chapter 22, 11 pages.
Yi Yang et al. "CPU-assisted GPGPU on fused CPU-GPU architectures", IEEE, Feb. 2012, 12 pages.
Debra Cook et al. "Secret Key Cryptography Using Graphics Cards", Columbia University Technical Report, Jan. 14, 2004, 14 pages.
Matthew Hogan et al. "Robust Verification of 3D-Ics: Pros, Cons and Recommendations", IEEE, Aug. 21, 2009, 6 pages.
Carlos Carvalho, "The Gap Between Processor and Memory Speeds", ICCA, 2002, 8 pages.
Christianto C. Liu et al. "Bridging the Processor-Memory Performance Gap with 3D IC Technology", IEEE vol. 22, Issue 6, Nov. 21, 2005, 9 pages.
Jon Stokes "Ask Ars: what is a CPU thread?" Ministry of Innovation of Technology, Apr. 12, 2011, 2 pages.
"Computer-System Operation", <http://siber.cankaya.edu.tr/operatingsystems/ceng328/node15.html> Feb. 14, 2011, 4 pages.
Non-Final Office Action mailed Feb. 27, 2014 for U.S. Appl. No. 13/567,958, 24 pages.
International Search Report and Written Opinion correlating to PCT/US2013/053596 dated Dec. 9, 2013, 8 pages.
International Search Report and Written Opinion correlating to PCT/US2013/053599 dated Dec. 9, 2013, 8 pages.
International Search Report and Written Opinion correlating to PCT/US13/075956 dated May 9, 2014, 13 pages.
Non-Final Office Action mailed May 14, 2014 for U.S. Appl. No. 13/726,145, 23 pages.
Non-Final Office Action mailed Nov. 7, 2014 for U.S. Appl. No. 13/726,142, 20 pages.
U.S. Appl. No. 14/551,147, filed Nov. 24, 2014, entitled "Die-Stacked Memory Device With Reconfigurable Logic".
Non-Final Office Action mailed Dec. 17, 2014 for U.S. Appl. No. 13/723,143, 13 pages.
Non-Final Office Action mailed Dec. 22, 2014 for U.S. Appl. No. 13/726,144, 14 pages.
Non-Final Office Action mailed Dec. 23, 2014 for U.S. Appl. No. 13/726,146, 14 pages.
Final Office Action mailed Aug. 11, 2014 for U.S. Appl. No. 13/567,958, 27 pages.
Notice of Allowance mailed Aug. 25, 2014 for U.S. Appl. No. 13/726,145, 22 pages.

(56) References Cited

OTHER PUBLICATIONS

Non-Final Office Action mailed Sep. 21, 2015, for U.S. Appl. No. 14/551,147, 23 pages.
Notice of Allowance mailed Jul. 29, 2015 for U.S. Appl. No. 13/726,144, 31 pages.
U.S. Appl. No. 13/726,145, filed May 18, 2015, entitled "Die-Stacked Device With Partitioned Multi-Hop Network".
Non-final OFfice Action mailed Jun. 18, 2015 for U.S. Appl. No. 13/941,791, 52 pages.
Notice of Allowance mailed Feb. 20, 2015 for U.S. Appl. No. 13/726,142, 19 pages.
Notice of Allowance mailed Jun. 18, 2015 for U.S. Appl. No. 13/726,146, 29 pages.
Notice of Allowance mailed May 11, 2015 for U.S. Appl. No. 13/726,143, 24 pages.
Non-Final Office Action mailed Jul. 5, 2016, for U.S. Appl. No. 15/016,363, 22 pages.
Deng, Yangdong, et al.: "Physical Design of the 2.5D Stacked System," Proceedings 2003 IEEE International conference on Computer Design: VLSI in Computers and Processors. ICCD 2003, San Jose, CA, Oct. 13-15, 2003, pp. 211-217.
Maxfield, Clive: "2D vs. 2.5D vs. 3D ICs 101," EE Times, Aug. 4, 2012, <url:http://www.eetimes.com/document.asp?doc_id=1279540>, accessed Aug. 23, 2016, 8 pages.
Sankaralingam, K., et al.: "Routed Inter-ALU Networks for ILP Scalability and Performance," Proceedings 2003 IEEE International Conference on Computer Design: VLSI in Computers and Processors, ICCD 2003, San Jose, CA, Oct. 13-15, 2003, 8 pages.
Athas W.C., et al.: "Multicomputer: Message-Passing Concurrent Computer," IEEE, vol. 21, No. 8, Aug. 1998, pp. 9-24.
Seitz, C.L.,: "Let's Route Packets Instead of Wires," Proceedings of the Sixth MIT Conference, Advanced Research on VLSI, Jan. 1990, 8 pages.
International Preliminary Report on Patentability correlating to PCT/US13/053596 dated Feb. 10, 2015, 5 pages.
EP Examination Report mailed May 27, 2016, for EP Application No. 13750437.9, 6 pages.
EP Supplemental Search Report mailed Jul. 28, 2016, for EP Application No. 13865761.4, 11 pages.
NPL Non-Final Office Action mailed Jan. 15, 2015 for U.S. Appl. No. 13/941,791, 33 pages.

\* cited by examiner

STACKED MEMORY DEVICE WITH METADATA MANAGEMENT

CROSS-REFERENCE TO RELATED APPLICATIONS

The present application is related to U.S. patent application Ser. No. 13/567,958, filed on even date herewith and entitled "Stacked Memory Device with Helper Processor," the entirety of which is incorporated by reference herein.

BACKGROUND

Field of the Disclosure

The present disclosure generally relates to memory devices, and more particularly, to stacked memory devices.

Description of the Related Art

Memory bandwidth and latency are significant performance bottlenecks in many processing systems. These performance factors may be improved to a degree through the use of stacked, or three-dimensional (3D), memory, which provides increased bandwidth and reduced intra-device latency through the use of through-silicon vias (TSVs) to interconnect multiple stacked layers of memory. However, system memory and other large-scale memory typically are implemented as separate from the other components of the system. A system implementing 3D stacked memory therefore can continue to be bandwidth-limited due to the bandwidth of the interconnect connecting the 3D stacked memory to the other components and latency-limited due to the propagation delay of the signaling traversing the relatively-long interconnect and the handshaking process needed to conduct such signaling. The inter-device bandwidth and inter-device latency have a particular impact on processing efficiency and power consumption of the system when a performed task requires multiple accesses to the 3D stacked memory as each access requires a back-and-forth communication between the 3D stacked memory and thus the inter-device bandwidth and latency penalties are incurred twice for each access.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF PREFERRED EMBODIMENTS

FIGS. 1-14 illustrate example techniques for improved processing efficiency and decreased power consumption in a processing system through the use of a stacked memory device implementing an integrated metadata manager to offload metadata management for operational data stored in memory cell circuitry of the stacked memory device. The stacked memory device includes a set of stacked memory layers and a set of one or more logic layers, wherein the one or more logic layers implement the metadata manager and a memory interface. The memory interface is coupled to the memory cell circuitry and is coupleable to one or more devices external to the stacked memory device. The memory interface operates to perform memory accesses in response to memory access requests from both the metadata manager and the one or more external devices. The metadata manager comprises logic to perform one or more metadata management operations for metadata stored at the stacked memory device in association with the stored operational data. Examples of such metadata management operations include, but are not limited to, address translation operations, data security or data integrity operations (e.g., checksum or error correcting code calculation or validation), garbage collection operations, memory utilization profiling, memory logging, and the like. Due to the metadata manager's tight integration with the memory layers, the metadata manager can access metadata stored in the memory layers with higher bandwidth and lower latency and power consumption compared to the external devices. Moreover, the offloading of metadata management to the stacked memory device permits the external devices to perform other tasks focusing on the operational data, thereby increasing the overall processing throughput of the system.

The term "operational data," as used herein, refers to data used by a device of the system in the performance of an operation on behalf of an operating system, hypervisor, or software application. The term "metadata," as used herein, refers to data that describes a characteristic, identifier, or representation of a system use of corresponding operational data. Examples of operational data include instruction data and operand data. Examples of metadata include data integrity/security information, such as parity bits, checksums, and error correcting codes (ECCs), address translation information (e.g., page table entries and translation lookaside buffer entries), status indicators (e.g., dirty bits, valid bits, reachable bits), and the like. More generally, operational data is data provided to the stacked memory device for storage, and metadata is data used by the stacked memory device to access, characterize, or modify the stored operational data.

Figure 1:
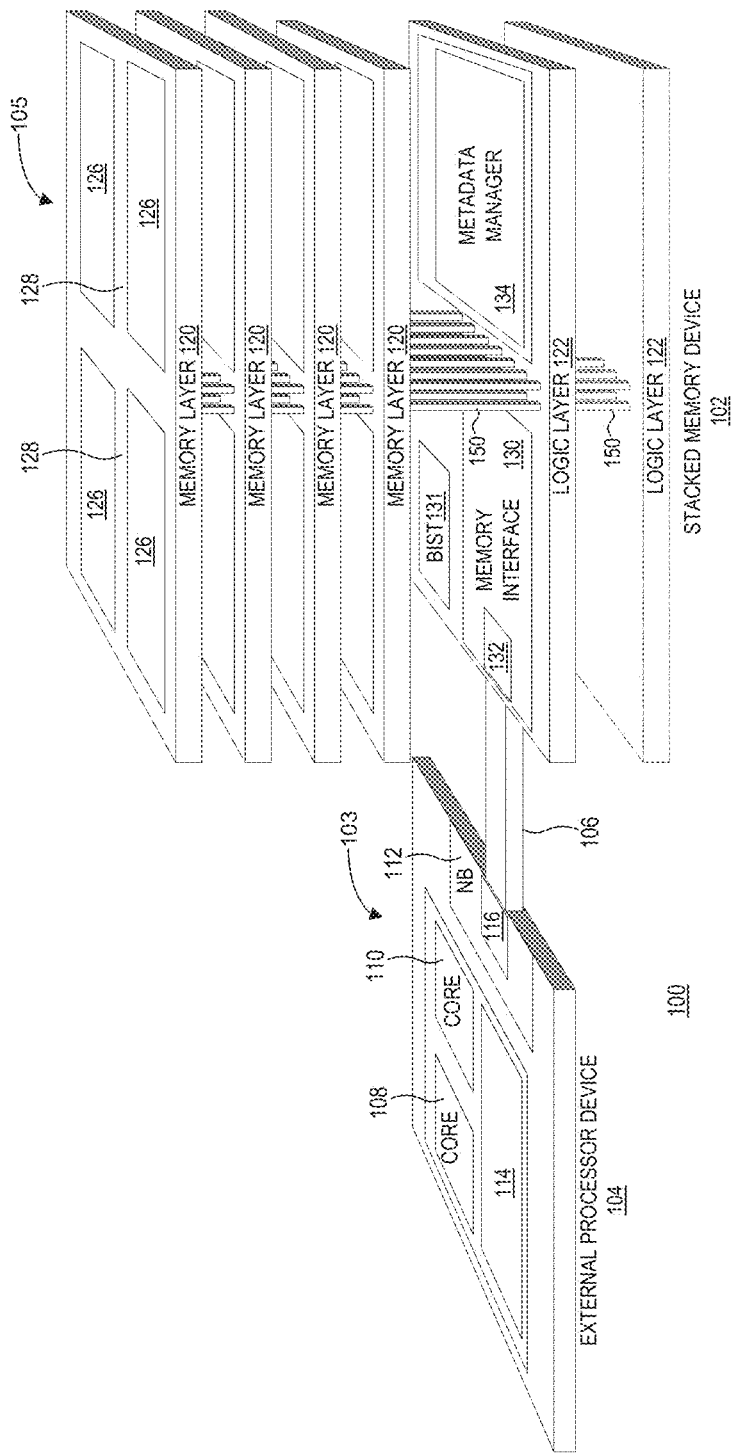
FIG. 1 is a diagram illustrating an exploded perspective view of a processing system employing a metadata manager in a vertical-stack configuration in accordance with at least one embodiment of the present disclosure.

FIG. 1 illustrates a processing system 100 in accordance with at least one embodiment of the present disclosure. The processing system 100 can comprise any of a variety of computing systems, including a notebook or tablet computer, a desktop computer, a server, a network router, switch, or hub, a computing-enabled cellular phone, a personal digital assistant, and the like. In the depicted example, the processing system 100 includes a stacked memory device 102 and at least one external device 104 coupled via an inter-device interconnect 106. The processing system 100 also can include a variety of other components not illustrated in FIG. 1, such as one or more display components, storage devices, input devices (e.g., a mouse or keyboard), and the like. While the processing system 100 can include multiple external devices 104 coupled to the stacked memory device 102 via the inter-device interconnect 106, an example implementation with a single external device 104 is described herein for ease of illustration. In one embodiment, the external device 104 is implemented as an integrated circuit (IC) package 103 and the stacked memory device 102 is implemented as an IC package 105 separate from the IC package 103 implementing the external device 104. In another embodiment, the external device 104 and the stacked memory device 102 are implemented as separate sets of dies connected via an interposer in the same IC package. In either instance, the external device 104 is "external" with reference to the stacked memory device 102.

In the illustrated example, the external device 104 is a processing device, although an external device 104 can be other types of devices. In this example, the external device comprises one or more processor cores, such as processor cores 108 and 110, a northbridge 112, and peripheral components 114. The processor cores 108 and 110 can include any of a variety of processor cores and combinations thereof, such as a central processing unit (CPU) core a graphics processing unit (GPU), a digital signal processor (DSP), and the like. The peripheral components 114 can include, for example, an integrated southbridge or input/output controller, one or more level 3 (L3) caches, and the like. The northbridge 112 includes, or is associated with, a memory controller interface 116 comprising a physical interface (PHY) connected to the conductors of the inter-device interconnect 106.

The inter-device interconnect 106 can be implemented in accordance with any of a variety of conventional interconnect or bus architectures, such as a Peripheral Component Interconnect-Express (PCI-E) architecture, a HyperTransport architecture, a QuickPath Interconnect (QPI) architecture, and the like. Alternatively, the inter-device interconnect 106 can be implemented in accordance with a proprietary bus architecture. The inter-device interconnect 106 includes a plurality of conductors coupling transmit/receive circuitry of the memory interface 116 of the external device 104 with the transmit/receive circuitry of the memory interface 130 of the stacked memory device 102. The conductors can include electrical conductors, such as printed circuit board (PCB) traces or cable wires, optical conductors, such as optical fiber, or a combination thereof.

The stacked memory device 102 may implement any of a variety of memory cell architectures, including, but not limited to, volatile memory architectures such as dynamic random access memory (DRAM) and static random access memory (SRAM), or non-volatile memory architectures, such as read-only memory (ROM), flash memory, ferroelectric RAM (F-RAM), magnetoresistive RAM, and the like. For ease of illustration, the example implementations of the stacked memory device 102 are described herein in the example, non-limiting context of a DRAM architecture.

As illustrated by the exploded perspective view, the stacked memory device 102 comprises a set of stacked memory layers 120 and a set of one or more logic layers 122. Each memory layer 120 comprises memory cell circuitry 126 implementing bitcells in accordance with the memory architecture of the stacked memory device 102 and the peripheral logic circuitry 128 implements the logic and other circuitry to support access and maintenance of the bitcells in accordance with this memory architecture. To illustrate, DRAM typically is composed of a number of ranks, each rank comprising a plurality of banks, and each bank comprising a matrix of bitcells set out in rows and columns. Accordingly, in one embodiment, each memory layer 120 may implement one rank (and thus the banks of bitcells for the corresponding rank). In another embodiment, the DRAM ranks each may be implemented across multiple memory layers 120. For example, the stacked memory device 102 may implement four ranks, each rank implemented at a corresponding quadrant of each of the memory layers 120. In either implementation, to support the access and maintenance of the DRAM bit cells, the peripheral logic circuitry 128 may include, for example, line drivers, bitline/wordline precharging circuitry, refresh circuitry, row decoders, column select logic, row buffers, sense amplifiers, and the like.

The one or more logic layers 122 implement logic to facilitate access to the memory of the stacked memory device 102. This logic includes, for example, the memory interface 130, built-in self test (BIST) logic 131, and the like. The memory interface 130 can include, for example, receivers and line drivers, memory request buffers, scheduling logic, row/column decode logic, refresh logic, data-in and data-out buffers, clock generators, and the like. Although the illustrated embodiment depicts a memory controller 116 implemented at the external device 104, in other embodiments, a memory controller instead may be implemented at the memory interface 130. The memory interface 130 further comprises a bus interface 132 comprising a PHY coupleable to the conductors of the inter-device interconnect 106, and thus coupleable to the external device 104.

In addition to implementing logic to facilitate access to the memory implemented by the memory layers 120, one or more logic layers 122 implement a metadata manager 134 to perform metadata management operations on metadata maintained at the stacked memory device 102 in association with operational data stored at the stacked memory device 102 for the benefit of the external device 104 or other external component of the processing system 102. The metadata manager 134 is coupled to the memory interface 130 and comprises logic to perform one or more metadata management operations on metadata stored at the stacked memory device 102 in association with operational data stored at the stacked memory device 102. The metadata manager 134 may include storage elements (e.g., registers, caches, or content addressable memories) located at one or more of the logic layers 122 to store the metadata, the memory cell circuitry 126 may store the metadata, or some portions of the metadata may be stored in the storage elements of the logic layers 122 while other portions are stored in the memory cell circuitry 126. For metadata stored at the memory cell circuitry 126, some metadata may be stored with the corresponding operational data (e.g., in certain instances, checksum data may be stored in the same memory location as used to store the corresponding operational data), whereas in other instances the metadata is stored separately from the corresponding operational data (e.g., ECC data may be stored in an ECC array separate from the memory locations storing the corresponding operational data). Further, in one embodiment, the metadata manager 134 can employ a non-volatile memory (NVM), such as flash memory, at a logic layer 122 or in a memory layer 120, to retain certain metadata after a power-down event.

In the illustrated example, the metadata manager 134 and the memory interface 130 are implemented on the same logic layer 122. In other embodiments, the memory interface 130 and the metadata manager 134 may be implemented on different logic layers. For example, the memory interface 130 may be implemented at one logic layer 122 and the metadata manager 134 may be implemented at another logic layer 122. In yet another embodiment, one or both of the memory interface 130 and the metadata manager 134 may be implemented across multiple logic layers. To illustrate, the memory interface 130 and the logic circuitry of the metadata manager 134 may be implemented at one logic layer 122 and certain storage elements of the metadata manager 134 (e.g., a cache or content addressable memory) may be implemented at another logic layer 122.

In the depicted implementation of FIG. 1, the stacked memory device 102 is implemented in a vertical stacking arrangement whereby power and signaling are transmitted between the logic layers 122 and the memory layers 120 using dense through silicon vias (TSVs) 150 or other vertical interconnects. Although FIG. 1 depicts the TSVs 150 in a set of centralized rows, the TSVs 150 instead may be more dispersed across the floorplans of the layers. Note that FIG. 1 provides an exploded-view representation of the layers 120 and 122 to permit illustration of the TSVs 150 and the components of the layers 120 and 122. In implementation, each of the layers overlies and is in contact with the preceding layer. In one embodiment, the metadata manager 134 accesses with the memory implemented at the memory layers 120 directly via the TSVs 150 (that is, the metadata manager 134 implements its own memory controller). In another embodiment, the memory interface 130 controls access to the TSVs 150 and thus the metadata manager 134 accesses the memory layers 120 through the memory interface 130.

The stacked memory device 102 may be fabricated using any of a variety of 3D integrated circuit fabrication processes. In one approach, the layers 120 and 122 each are implemented as a separate substrate (e.g., bulk silicon) with active devices and one or more metal routing layers formed at an active surface (that is, each layer comprises a separate die or "chip"). This approach can include a wafer-on-wafer process whereby a wafer comprising a matrix of dice is fabricated and thinned, and TSVs are etched through the bulk silicon. Multiple wafers are then stacked to achieve the illustrated layer configuration (e.g., a stack of four wafers comprising memory circuitry dies for the four memory layers 120 and a wafer comprising the logic die for the logic layer 122), aligned, and then joined via thermocompression. The resulting stacked wafer set is singulated to separate the individual 3D IC devices, which are then packaged. In a die-on-die process, the wafer implementing each corresponding layer is first singulated, and then the dies are separately stacked and joined to fabricate the 3D IC devices. In a die-on-wafer approach, wafers for one or more layers are singulated to generate the dice for one or more layers, and these dice are then aligned and bonded to the corresponding die areas of another wafer, which is then singulated to produce the individual 3D IC devices. One benefit of fabricating the layers 120 and 122 as dice on separate wafers is that a different fabrication process can be used to fabricate the logic layers 122 than that used to fabricate the memory layers 120. Thus, a fabrication process that provides improved performance and lower power consumption may be used to fabricate the logic layers 122 (and thus provide faster and lower-power interface logic and circuitry for the metadata manager 134), whereas a fabrication process that provides improved cell density and improved leakage control may be used to fabricate the memory layers 120 (and thus provide more dense, lower-leakage bitcells for the stacked memory).

In another approach, the layers 120 and 122 are fabricated using a monolithic 3D fabrication process whereby a single substrate is used and each layer is formed on a preceding layer using a layer transfer process, such as an ion-cut process. The stacked memory device 102 also may be fabricated using a combination of techniques. For example, the logic layers 120 may be fabricated using a monolithic 3D technique, the memory layers may be fabricated using a die-on-die or wafer-on-wafer technique, or vice versa, and the resulting logic layer stack and memory layer stack then may be bonded to form the 3D IC device for the stacked memory device 102.

Figure 2:
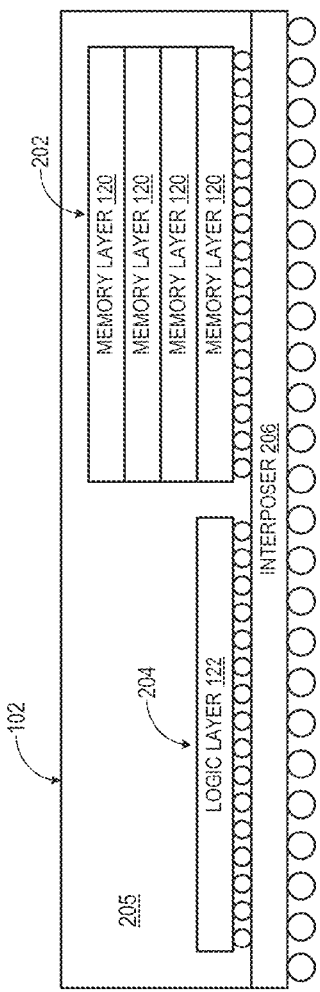
FIG. 2 is a diagram illustrating a cross-section view of an alternative implementation of the processing system of FIG. 1 in a side-split configuration in accordance with at least one embodiment of the present disclosure.

FIG. 2 illustrates a cross-section view of an alternative implementation of the stacked memory device 102 in accordance with another embodiment of the present disclosure. Rather than implement a vertical stack implementation as shown in FIG. 1 whereby the one or more logic layers 122 are vertically aligned with the memory layers 120, the stacked memory device 102 instead may implement the side-split arrangement of FIG. 2 whereby the stacked memory layers 120 are implemented as an IC device 202 and the one or more logic layers 122 are implemented as a separate IC device 204, and the IC devices 202 and 204 (and thus the logic layers 122 and the memory layers 120) are connected via an interposer 206. The interposer can comprise, for example, one or more levels of silicon interposers, a printed circuit board (PCB), or a combination thereof. Although FIG. 2 illustrates the stacked memory layers 120 together implemented as a single IC device 202, the stacked memory layers 120 instead may be implemented as multiple IC devices 202, with each IC device 202 comprising one or more memory layers 120. Likewise, the logic layers 122 may be implemented as a single IC device 204 or as multiple IC devices 204. The one or more IC devices 202, the one or more IC devices 204, and the unifying substrate 206 are packaged as an IC package 205 representing the stacked memory device 102.

Figure 3:
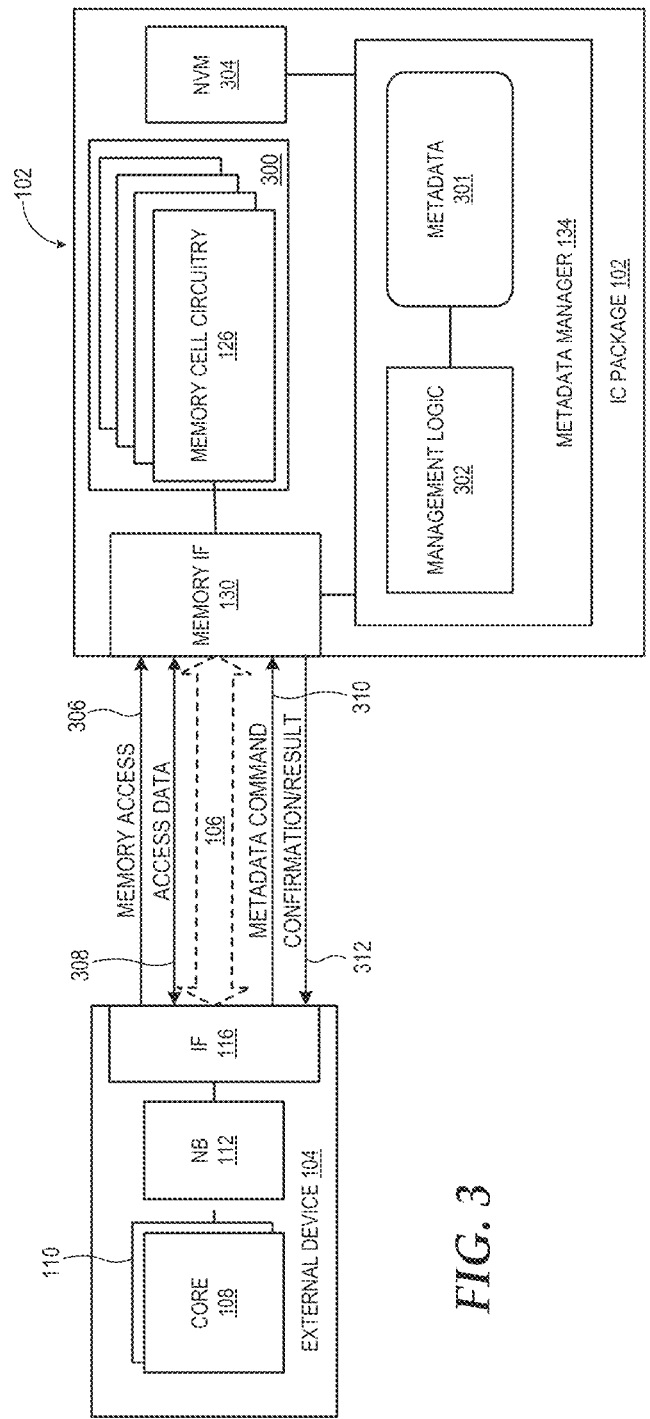
FIG. 3 is a block diagram illustrating the processing system of FIG. 1 in greater detail in accordance with at least one embodiment of the present disclosure.
Figure 4:
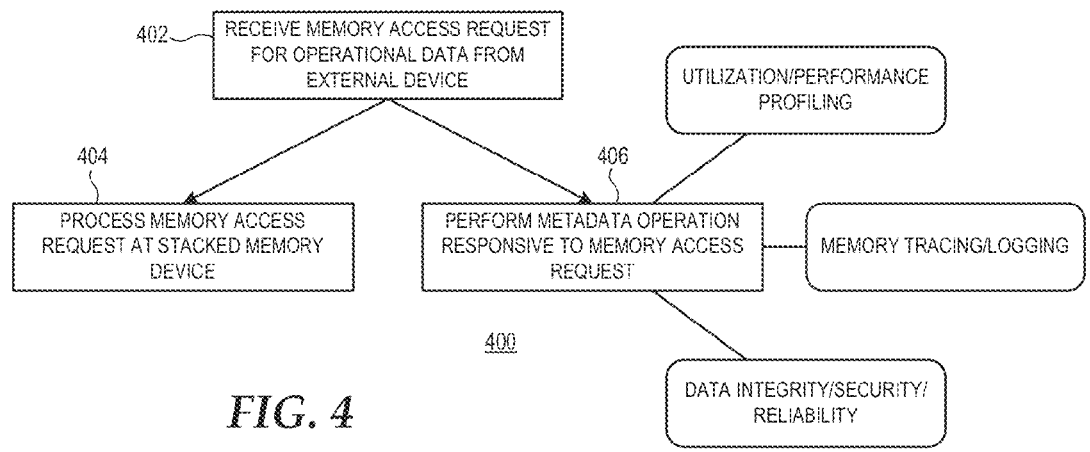
FIG. 4 is a flow diagram illustrating an example method of performing a metadata management operation in response to a memory access request in accordance with at least one embodiment of the present disclosure.
Figure 5:
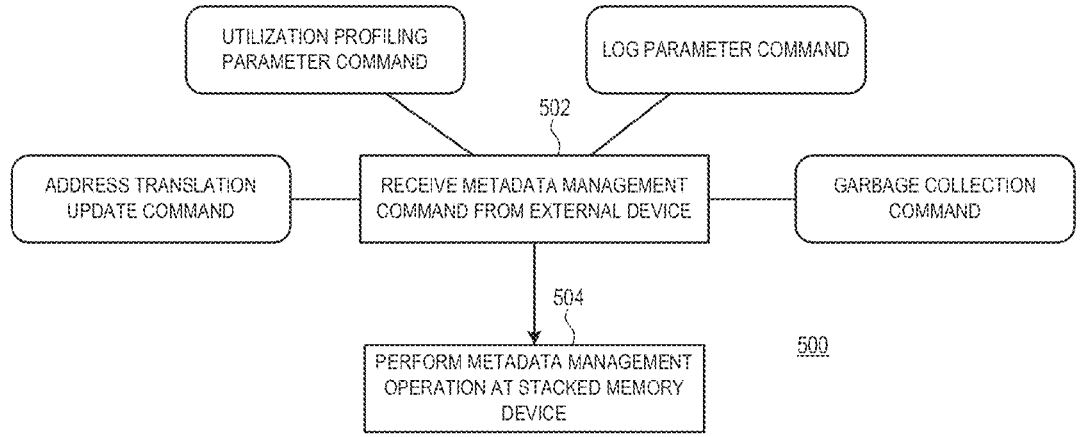
FIG. 5 is a flow diagram illustrating an example method of performing a metadata operation in response to a metadata command in accordance with at least one embodiment of the present disclosure.
Figure 6:
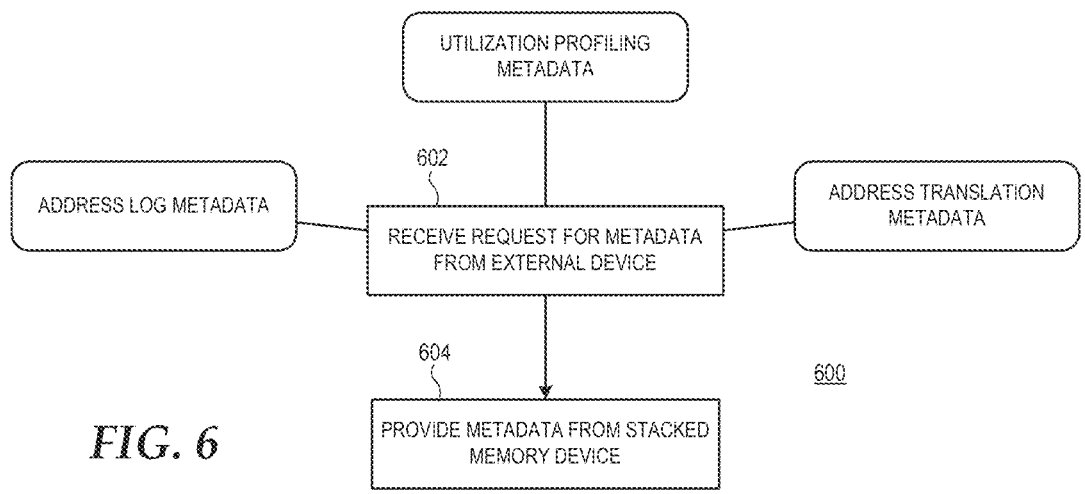
FIG. 6 is a flow diagram illustrating an example method of providing metadata from a stacked memory device in accordance with at least one embodiment of the present disclosure.

FIG. 3 illustrates the processing system 100 in block diagram form and FIGS. 4-6 illustrate various example methods of operation of the processing system 100 with respect to the block diagram depiction of FIG. 3 in accordance with at least one embodiment of the present disclosure. As noted above, the processing system 100 includes one or more external devices 104 and the stacked memory device 102 coupled via an inter-device interconnect 106, whereby the stacked memory device 102 implements a stacked memory 300 represented by multiple stacked layers of memory cell circuitry 126 and implements a metadata manager 134 to perform one or more metadata management operations with respect to metadata 301 stored at the stacked memory device 102. The metadata 301 may be stored at the stacked memory 300, at a register file, CAM, cache, or other storage element at a logic layer 122 (FIGS. 1 and 2), in a non-volatile memory 304, or a combination thereof. The metadata manager 134 comprises management logic 302 having access to the stored metadata 301 and which is configured to perform metadata management operations with respect to the stored metadata 301. The stacked memory device 102 further includes the memory interface 130 to perform memory accesses in response to memory access requests from both the external device 104 and the metadata manager 134.

In operation, the stacked memory device 102 functions as a conventional system memory for storing operational data on behalf of other system components. In a conventional memory access operation, the external device 104 (or other system component) issues a memory access request 306 by manipulating the PHY of its memory interface 116 to transmit address signaling and, if the requested memory access is a write access, data signaling via the inter-device interconnect 106 to the stacked memory device 102. The PHY of the memory interface 130 receives the signaling, buffers the memory access request represented by the signaling, and then accesses the memory cell circuitry 126 to fulfill the requested memory access. In the event that the memory access request 306 is a write access, the memory interface 130 stores the signaled operational data to the location of the memory 300 indicated by the signaled address. In the event that the memory access request 306 is a read request, the memory interface 130 accesses the requested operational data from the location of the memory 300 corresponding to the signaled address and manipulates the PHY of the memory interface 130 to transmit signaling representative of the accessed operational data 308 to the external device 104 via the inter-device interconnect 106.

Moreover, the stacked memory device 102 also functions to offload the task of managing metadata for the stored operational data from the external devices 102 of the processing system 100. In one embodiment, the metadata manager 134 of the stacked memory device 102 performs metadata management operations associated with certain operational data responsive to memory accesses to the certain operational data by the external device 104. For example, in response to a read access request, the management logic 302 can access the stored checksum (one embodiment of metadata) or other error detection code for the read data, recalculate the checksum from the read data, and compare the stored checksum with the recalculated checksum to verify the integrity of the stored data before the memory interface 130 outputs the read data to the external device 104.

The metadata manager 134 also can perform metadata management operations in response to a metadata command 310 from the external device 104. For example, the management logic 302 may be configured to support a mark-and-sweep function for a garbage collection process, and the external device 104 can direct the stacked memory device 102 to mark an object at address X as reachable by issuing a metadata command 310 in the form of a "MARK(X)" command, in response to which the management logic 302 writes a specified value (e.g., a "1") to a reachable status bit (one embodiment of metadata) associated with the operational data stored at address X. The metadata manager 134 can provide a response 312 to the metadata command 310 issued by the external device 104, whereby the response 312 can include, for example, a confirmation that the metadata command 310 has been received and carried out, or a result of the performance of the metadata management operation represented by the metadata command 310.

The metadata manager 134 further can perform metadata management operations independent of memory access requests, metadata commands, or other signaling from the external device 104. Certain metadata management operations may be software-invisible or background operations run independent of the external device 104. To illustrate, the management logic 302 may be configured to periodically scan through the operational data and the corresponding ECC values to identify and correct operational data that was corrupted due to a soft error or a malfunction of the memory cell circuitry 126.

Method 400 of FIG. 4 illustrates, in the context of the block diagram of FIG. 3, an example operation of the stacked memory device 102 for performing metadata management operations responsive to memory accesses by the external device 104. The method 400 initiates at block 402, whereupon the external device 104 issues a memory access request 306 (FIG. 3) to the stacked memory device 102. The memory access request 306 can comprise a read access request to read operational data stored at the stacked memory device 102 or a write access request to write operational data to the stacked memory device 102.

At block 404, the memory interface 130 of the stacked memory device 102 processes the memory access request 306 either by storing the operational data (for a write access) to the memory cell circuitry 126 or by accessing the operational data (for a read access) from the memory cell circuitry 126 and providing the accessed operational data to the external device 104. Concurrently, at block 406 the metadata manager 134 performs one or more metadata management operations responsive to the memory access request 306 and which are associated with the memory access request 306. For example, the metadata manager 134 can be configured to perform a memory utilization profiling operation and the metadata management operations performed at block 406 in conjunction with the memory access can include, for example, updating or otherwise modifying memory utilization profiling information, such as a utilization metric, (embodiments of metadata) associated with the memory address or memory address range accessed by the memory access. As another example, the metadata manager 134 can be configured to perform memory tracing or other memory logging operations and the metadata management operations performed at block 406 can include logging the memory address accessed by the memory access in a memory log (embodiments of metadata). As yet another example, the metadata manager 134 can be configured to provide data integrity, security, or reliability functionality with respect to the operational data stored at the stacked memory device 102, and thus the metadata management operations performed at block 406 can include, for example, computing or validating error detection values associated with stored operational data, where the error detection values can include one or more of a checksum, ECC value, or parity bit for the operational data associated with the memory access.

Method 500 of FIG. 5 illustrates, in the context of the block diagram of FIG. 3, an example operation of the stacked memory device 102 for performing metadata management operations responsive to metadata commands from the external device 104. The method 500 initiates at block 502, whereupon the external device 104 issues a metadata command 310 (FIG. 3) to the stacked memory device 102. The metadata command 310 represents an explicit instruction or other command to the metadata manager 134 to perform one or more metadata management operations. In response to the metadata command 310, at block 504 the metadata manager 134 performs one or more metadata management operations represented by the metadata command 310. These metadata management operations can include, for example, operations to generate metadata, operations to output specified metadata, operations to modify specified metadata, and the like.

To illustrate, in one embodiment the metadata manager 134 provides address translation support for the external device 104 so as to avoid multiple successive memory accesses by the external device 104 that would otherwise be necessary for the external device 104 to perform a page table walk to determine the appropriate physical address for a corresponding virtual address. In this implementation, the external device 104 could instead issue an address translate command to the metadata manager 134, which could then page walk through the locally stored page tables or other address translation information (one embodiment of metadata) to determine and return to the external device 104 the physical address corresponding to the virtual address supplied with the address translation command. In instances whereby the metadata manager 134 provides memory utilization profiling, the metadata command can include, for example, a command to set the parameters for a desired profiling operation, such as resetting the profiling metrics for a given profiling operation, setting the memory address or memory address range to be profiled, setting the type of profiling (e.g., usage counting, frequency of access, etc.), and the like. The metadata command also could include a command to output to the external device 104 either the profiling metrics (one embodiment of metadata) for a memory utilization profiling operation, or a memory address pointing to the profiling metrics. As another illustration, the metadata command 310 can include a command pertaining to a memory logging operation performed by the metadata manager 134. In this context, the metadata command 310 can include, for example, a command to set the criteria for the memory logging operation, a command to output memory log information for a logging operation or a memory address pointing to the location of such information, and the like. The metadata command 310 also may include a command to modify the metadata itself. For example, in instances whereby the metadata manager 134 supports garbage collection for the operational data stored at the stacked memory 300 (FIG. 3), the metadata command 310 can include a command to modify garbage collection attributes, such as a "MARK(X)" command to set the "reachable" bit of a corresponding object stored at address X in the stacked memory 300.

Method 600 of FIG. 6 illustrates, in the context of the block diagram of FIG. 3, an example operation of the stacked memory device 102 for providing metadata to the external device 104. The method 600 initiates at block 602, whereupon the external device 104 issues a request for specified metadata to the stacked memory device 102. In response, at block 604 the metadata manager 134 accesses the specified metadata and provides the accessed metadata to the external device 104. Any of a variety of types of metadata can provided to the external device 104. As noted above, the provided metadata can include memory utilization/performance metrics, memory logs/traces, address translation information, data security/integrity information, and the like.

In one embodiment, the request specifies the metadata to be provided via an identifier, and the metadata manager 134 determines the location at which the metadata is stored based on the identifier, accesses the metadata from this location, and then outputs the accessed metadata. In another embodiment, the request specifies the memory address at which the metadata is stored, and the metadata manager 134 accesses and outputs the metadata from the specified location. In this instance, the metadata manager 134 could have previously supplied the memory address of the metadata to the external device 104, either in response to a metadata command 310 (FIG. 3) for the memory address, or as a confirmation in response to a metadata command 310 setting up the context for the metadata. For example, in response to a metadata command 310 (FIG. 3) directing the metadata manager 134 to set up a memory utilization profiling operation for a specified memory address range, the metadata manager 134 could send a response 312 (FIG. 3) confirming that the memory utilization profiling operation has been set up, with the response also including the starting memory address at which the utilization profiling metrics for the profiling operation are to be stored.

FIGS. 7-13 illustrate examples of metadata management operations performed by the stacked memory device 102 in order to take advantage of the low-latency, high-bandwidth connection between the metadata manager 134 and the stacked memory 300 or to otherwise offload metadata management operations from other components of the processing system 100.

Figure 7:
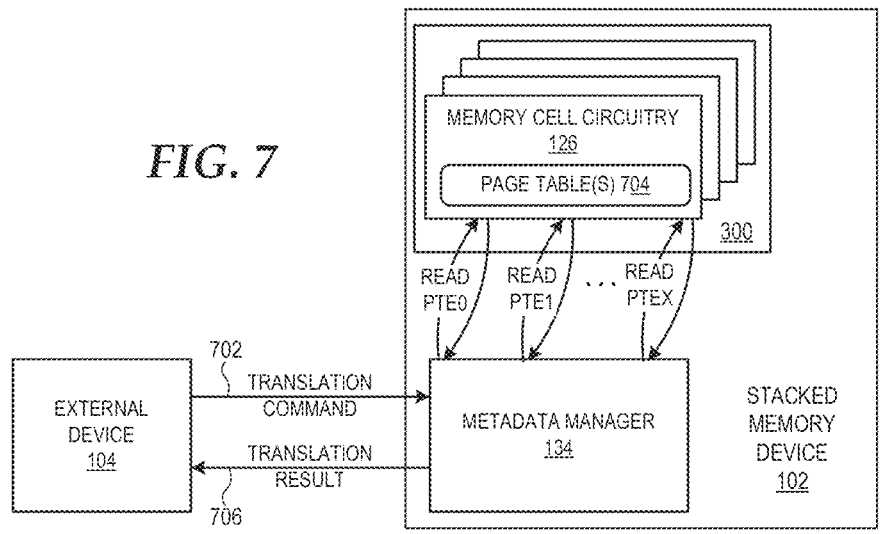
FIG. 7 is a diagram illustrating an example metadata management operation for performing a virtual-to-physical address translation in accordance with at least one embodiment of the present disclosure.

FIG. 7 depicts an example use of the metadata manager 134 to perform address translation operations on behalf of the external device 104. Many computer architectures, including x86 architectures, use virtual-to-physical address mapping to translate virtual addresses used by a processor device to physical addresses used by system memory and memory-mapped peripheral devices. Oftentimes, the processor device caches a translation lookaside buffer (TLB) that buffers recent virtual-to-physical address translations. However, in the event of a TLB miss, the processor device conventionally was required to traverse one or more page tables stored in memory to obtain the proper virtual-to-physical address translation. Current x86 architectures use up to four page tables, and thus a conventional page table walk can require up to four memory accesses (one access per page table entry per page table level) by the processor device. However, as the metadata manager 134 is tightly coupled with the stacked memory 300, the metadata manager 134 can be used to offload the memory address translation operation so that the external device 104 need initiate only one metadata command to obtain the translation in place of multiple separate memory accesses that would otherwise be required to perform a conventional page table walk. Further, under this approach it may not be necessary for the external device 104 to implement its own page table walker logic, and thus page table walker logic could be eliminated from the design of the external device 104 in reliance on the metadata manager 134 of the stacked memory device 102, thus saving area and cost in implementing the external device 104.

In the depicted example, the external device 104 issues an address translation command 702 (one embodiment of a metadata command) for a virtual address X to the stacked memory device 102. The address translation command 702 further may include other information used to perform the address translation, such as the value of the CR3 register in an x86 implementation so as to identify the location of the page directory for the page tables to be used in the address translation. The metadata manager 134 maintains state related to the management of the page tables (e.g., base pointers to the page tables 704 stored in the stacked memory 300). In response to the address translation command 702, the metadata manager 134 uses this maintained state and the information provided with the address translation command 702 to perform a page table walk by accessing one or more page table entries (the page table entry accesses identified as PTE0, PTE1, . . . PTEX in FIG. 7) of one or more levels of page tables 704 to obtain the requested address translation, and then provide the requested address translation information as a response 706 to the external device 104. Moreover, the page table management logic may implement or have access to a cache or other storage element that caches previously-performed address translations or caches entries from intermediate page table levels to accelerate the address translation process. While this process is underway, the external device 104 may continue execution of other operations in anticipation of receipt of the address translation information.

The page table management logic implemented at the metadata manager 134 can support other translation-related operations. For example, when the external device 104 initiates a write access request to a corresponding page of the stacked memory 300, the page table management logic can mark the corresponding page table entry as dirty so that an operating system of the external device 104 can determine that the page's contents may eventually need to be written out to disk or other non-volatile storage. To implement this process, the metadata manager 134 can support a metadata command "MARKDIRTY(X)" issued by the external device 104, in response to which the metadata manager 134 walks the page tables 704 to obtain the page table entry corresponding to virtual address X, and then sets the corresponding dirty bit for the page table entry. Similar metadata commands can be supported for marking the access bit, checking/setting permissions, invalidating or resetting a page table entry, allocating or installing a page table entry, and the like.

Figure 8:
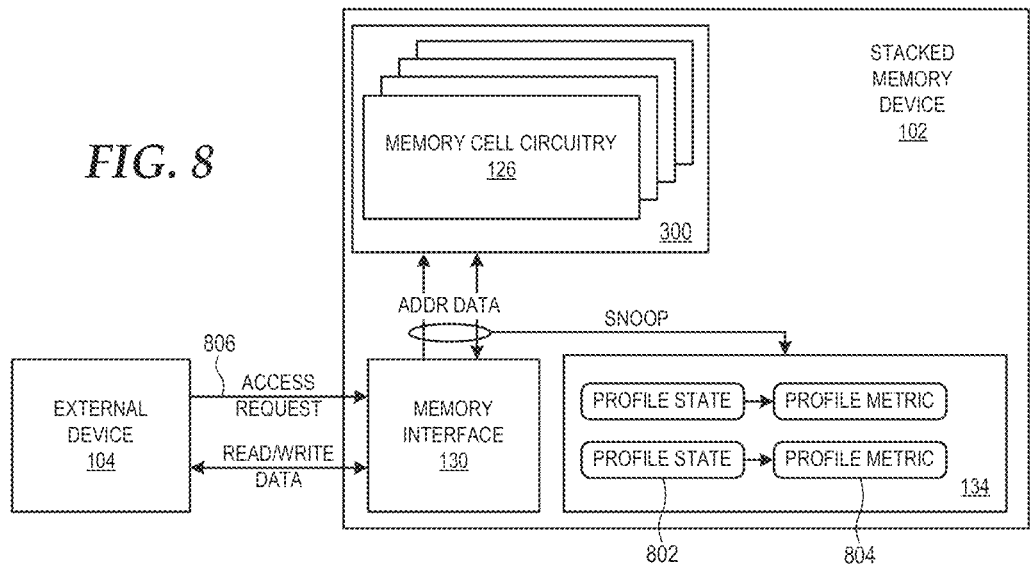
FIG. 8 is a diagram illustrating an example metadata management operation for memory utilization monitoring in accordance with at least one embodiment of the present disclosure.

FIG. 8 depicts an example use of the metadata manager 134 to provide support for dynamic memory performance/utilization profiling in accordance with one embodiment of the present disclosure. To support this functionality, profiling logic of the metadata manager 134 implements one or more profiling operations, each profiling operation specified by a stored profile state 802 and one or more corresponding profile metrics 804. The profile state 802 comprises information that represents the parameters of the corresponding profiling operation. For example, the profile state 802 may specify one or more memory addresses of interest or one or more continuous or discontinuous memory address ranges of interest, and the like. The some or all of the parameters of the profile state 802 may be supplied by the external device 104, such as via a metadata command that sets up the profiling operation. The profile metrics 804 comprise metrics maintained by the metadata manager 134 in accordance with the parameters of the corresponding profile state. The profile metrics can include, for example, a number of reads or writes to a specified memory address or memory address range, the frequency at which a specified memory address or memory address range is accessed or not accessed (as measured with respect to the total number of memory accesses received or with respect to absolute time/clock cycles), the number of unique memory locations accessed within a specified range, and the like. Thus, the profile metrics 804 may be implemented using, for example, counters, which may be either stored in the stacked memory 130 or implemented at a logic layer 122 (FIG. 1) as, for example, a register-mapped counter.

The profile metrics 804 for a profiling operation may be supplied to the external device 104 via, for example, a read access by the external device 104 to a memory location at which the profile metrics 804 are stored, or in response to a request for the profile metrics 804 in the manner described above with respect to FIG. 6. Although various examples of profile operations and corresponding profiling metrics are described above, the present disclosure is not limited to these examples, but instead may include profiling of any of a variety of memory utilization or performance metrics.

To implement a profiling operation specified by a stored profile state 802, the metadata manager 134 snoops the address bus ADDR between the memory interface 130 and the stacked memory 300. Thus, a memory access request 806 to address Y from the external device 104 triggers the generation of address signaling for the address Y on the address bus, which is snooped by the metadata manager 134. The metadata manager 134 compares the address Y with the memory addresses or memory address ranges specified by the profile states 302, and in the event of a hit, updates the corresponding profile metric 804. For example, if the profiling operation is to count the number of read and write accesses to a memory address range, if the address Y falls within this range, the metadata manager 134 increments a usage counter to reflect the access. Similarly, if the profiling operation is to count the number of unique locations accessed within a memory access range, if the address Y falls within the specified range, the metadata manager 134 can access a data structure storing a list previously-accessed addresses within the range, and if address Y is not in this list, increment a corresponding usage counter and add the address Y to the list.

Figure 9:
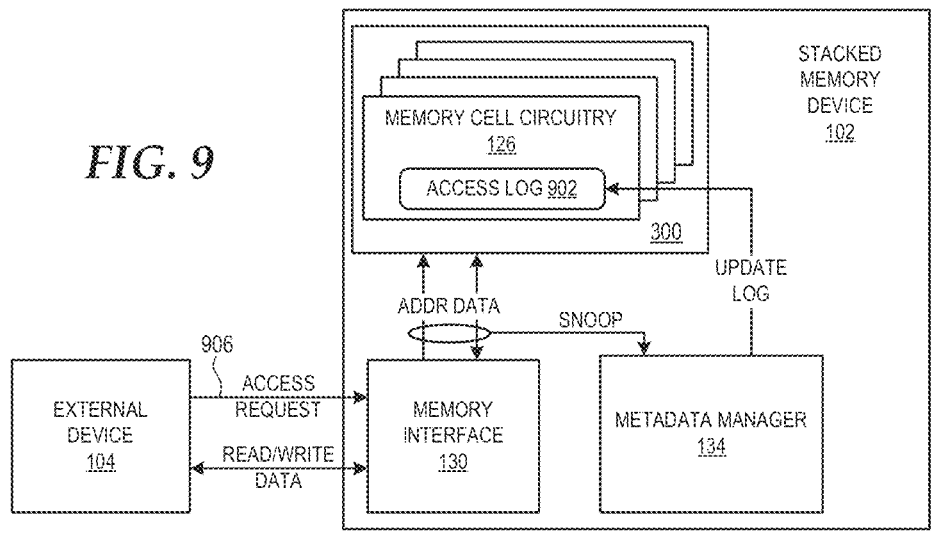
FIG. 9 is a diagram illustrating an example metadata management operation for memory logging in accordance with at least one embodiment of the present disclosure.

FIG. 9 depicts an example use of the metadata manager 134 to provide support for memory logging in accordance with one embodiment of the present disclosure. To support this functionality, trace logic of the metadata manager 134 implements at least one access log 902 for storing memory trace or log information regarding accesses to the stacked memory 300. The access log 902 can be implemented as a storage element (e.g., cache) at one of the logic layers 122 (FIG. 1) or at a region of the stacked memory 300 reserved for memory logging. The external device 104 can issue a metadata command to initiate the logging operation, terminate the logging operation, as well as to access the log information of the access log 902. As with the profiling example described above with reference to FIG. 8, to implement memory logging the metadata manager 134 snoops the address bus ADDR between the memory interface 130 and the stacked memory 300. Accordingly, a memory access request 906 issued by the external device 104 triggers the signaling of the corresponding address on the address buss ADDR, which in turn is snooped by the metadata manager 134 and logged in the access log 902. This approach can significantly reduce traffic between the external device 104 and the stacked memory 104. Under a conventional approach, the external device 104 or other device on the inter-device interconnect 106 (FIG. 1) would have to monitor the address bus of the inter-device interconnect 106 for memory accesses and then generate a separate write access request for processing by the memory interface 130 to update a log stored at the stacked memory 300. In contrast, the technique described above does not require the additional traffic between the external device and the stacked memory device 102 because the monitoring and log updating occur completely within the stacked memory device 102.

Figure 10:
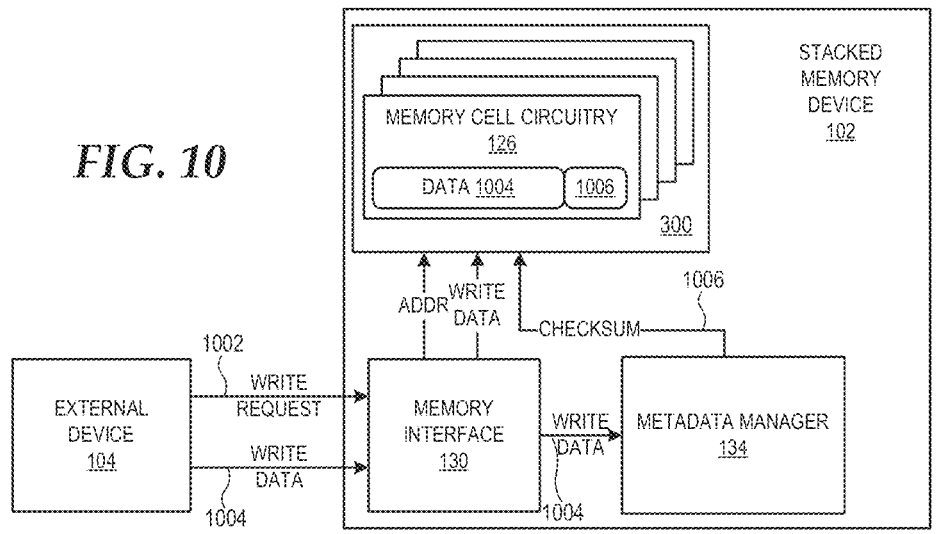
FIG. 10 is a diagram illustrating an example metadata management operation for error detection value calculation in accordance with at least one embodiment of the present disclosure.
Figure 11:
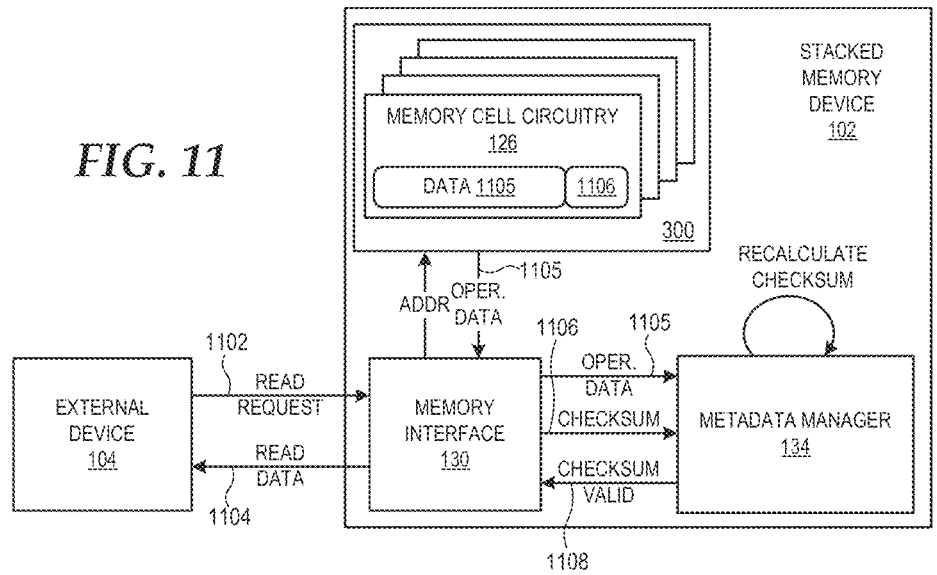
FIG. 11 is a diagram illustrating an example metadata management operation for error detection value validation in accordance with at least one embodiment of the present disclosure.

FIGS. 10 and 11 depict an example use of the metadata manager 134 to provide support for data security/integrity/reliability metadata management in accordance with one embodiment of the present disclosure. Parity bits, checksums, and cyclic redundancy checksums (CRCs) often are used for stored data to verify the integrity of the data, either by providing confidence in the correctness of computations or to detect malicious, unauthorized, or unintended modifications to stored data. Error correcting codes (ECC), like checksums and other error detecting metadata, facilitate the detection of errors in operational data, while also enabling a certain number of errors to be corrected. To facilitate management of such error detection/correction metadata, the metadata manager 134 can include logic that generates or validates such error detection values associated with stored operational data. In the example of FIG. 10, the metadata manager 134 includes logic to generate a checksum for operational data to be stored at a memory location X of the stacked memory 300. When a write request 1002 is issued by the external device 104 to store operational data at memory location X, the metadata manager 134 receives the write data 1004 associated with the write request (e.g., by snooping the data bus between the memory interface 130 and the stacked memory 300) and accesses the remainder of the unmodified operational data at memory location X (in the event that the memory location X is larger than the size of the write data 1004). The logic of the metadata manager 134 then computes a checksum 1006 for the operational data (including the write data 1004) to be stored at memory location X the write data 1004 and provides the checksum 1006 for storage at the stacked memory 300 in association with the memory location X. The checksum 1006 may be stored with the operational data at the memory location X, or in a separate checksum array in the stacked memory 300.

In the example of FIG. 11, the metadata manager 134 includes logic to validate the checksum for operational data stored at a memory location X of the stacked memory 300. When a read request 1102 is issued by the external device 104 to output read data 1104 from memory location X, the metadata manager 134 receives the operational data 1105 (including the read data 1104) stored at the memory location 1104 (e.g., by snooping the data bus between the memory interface 130 and the stacked memory 300) and receives the checksum 1106 for the operational data 1105. The logic of the metadata manager 134 then recomputes the checksum for the operational data 105 and compares the recomputed checksum with the accessed checksum 1106. In the event of a match, the metadata manager 134 asserts a checksum valid signal 1108 to indicate that the original checksum appears valid and thus the operational data 105 does not appear to be tampered with or otherwise corrupted. The memory interface 130 then may output the read data 1104 in response to the assertion of the checksum valid signal 1108. In the event that the recomputed checksum and the accessed checksum 1106 do not match, the metadata manager 134 may, for example, issue an exception or fault to the external device 104 to indicate that the operational data 1105 has been corrupted.

The processes similar to those described above may be implemented for other types of error detection or error-correcting metadata. For example, the metadata manager 134 can include logic to process ECC metadata to update, check, and repair errors in operational data stored in the stacked memory 300. The ECC management operations can be performed in response to memory access requests as described above. For example, ECC generation may be performed in response to a write access, and ECC validation (and error correction) may be performed in response to a read access. Furthermore, ECC management operations may be performed by the metadata manager 134 in the background. For example, the metadata manager 134 may operate to periodically or continually walk the operational data and ECC values stored in the stacked memory 300 to identify and correct errors in the operational data. The ECC management operations are, in certain implementations, distinguished from parity and checksum management operations in that ECC state typically is architecturally invisible to software. Accordingly, the memory controller at the external device 104 can be simplified by removing is support for ECC management in reliance on the ECC management provided by the metadata manager 134 of the stacked memory device 102.

While the data security/integrity/reliability metadata management operations are described above in the context of error correcting codes, other forms of error detection and correction may be supported by the metadata manager 134. To illustrate, the stacked memory 300 could implement redundant array of independent discs (RAID)-like functionality whereby additional parity bits (one embodiment of metadata) are computed and stored either interleaved across multiple regions of the stacked memory 300 or in a separate region of the stacked memory 300.

Figure 12:
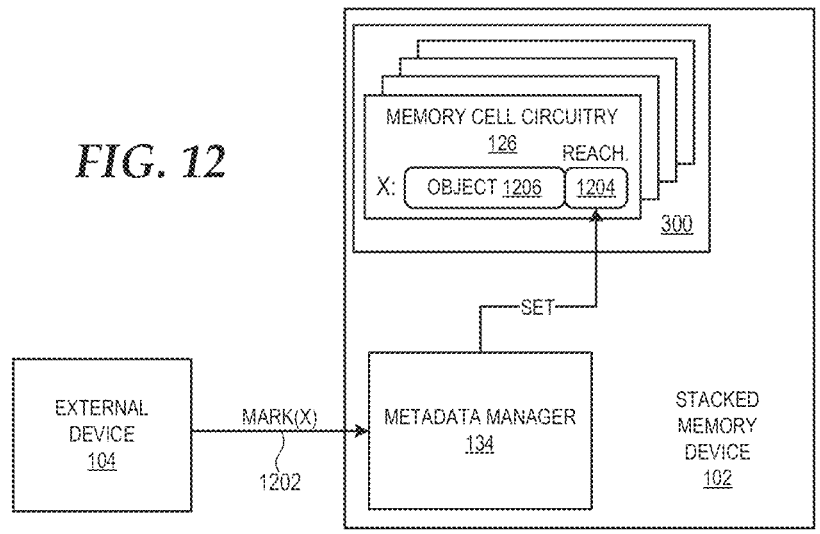
FIG. 12 is a diagram illustrating an example metadata management operation for a garbage collection mark process in accordance with at least one embodiment of the present disclosure.
Figure 13:
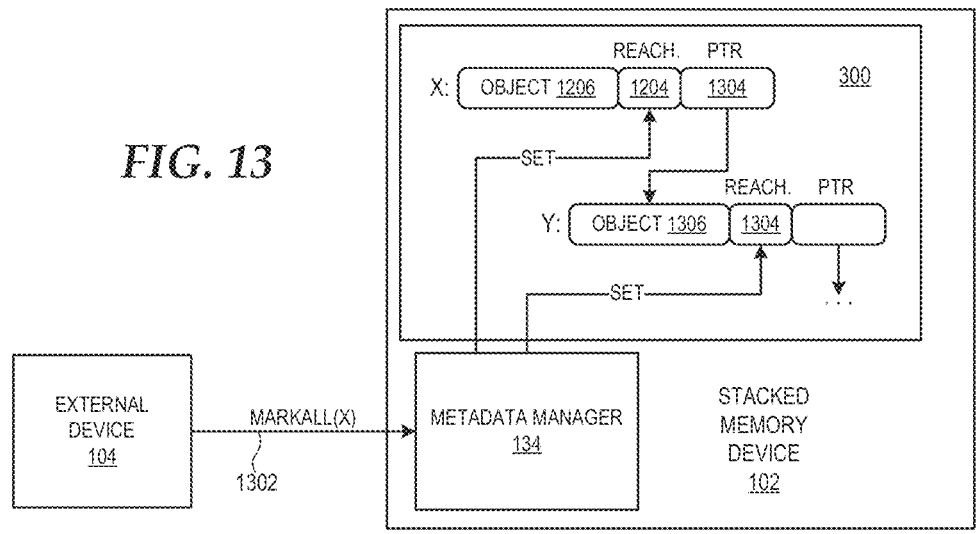
FIG. 13 is a diagram illustrating an example metadata management operation for another garbage collection mark process in accordance with at least one embodiment of the present disclosure.

FIGS. 12 and 13 depict an example use of the metadata manager 134 to provide support for garbage collection management in accordance with one embodiment of the present disclosure. Many computer systems implement a garbage collection process to reclaim memory locations occupied by operational data no longer in use by an application or operating system. Typically, the garbage collection process implements a mark-and-sweep approach. The garbage collector scans the memory to identify those objects that are "reachable", that is, is either directly or indirectly referenced by live program state. Those objects identified as reachable are so-identified (the "mark" part of "mark-and-sweep"), and the garbage collector then scans through the memory and invalidates those objects not marked as "reachable" (the "sweep" part of "mark-and-sweep"), thereby freeing up the memory locations storing the invalidated objects. The metadata manager 134 can include logic to implement such garbage collection operations for the stacked memory 300.

To illustrate, FIG. 12 depicts an example whereby the metadata manager 134 supports a metadata command 1202, "MARK(X)", in response to which the metadata manager 134 sets a reachable status bit 1204 associated with operational data 1206 at memory location X to a "reachable" state. Conversely, the metadata manager 134 can support a metadata command "CLEAR(X), in response to which the metadata manager 134 clears the reachable status bit 1204. In a conventional system, a processor device would need to read the reachable state from memory, modify the reachable state to reachable, and write the reachable state back to memory. In contrast, the above-described approach requires only a single command issued between the external device 104 and the stacked memory 102.

The metadata manager 134 also may implement a more sophisticated mark process. To illustrate, FIG. 13 depicts an example whereby the metadata manager 134 supports a metadata command 1302, "MARKALL(X)", in response to which the metadata manager 134 sets the reachable status bit 1204 associated with the operational data 1206 at memory location X to an reachable state, and then recursively visit any other objects (e.g., object 1306) referenced by the operational data 1206 (via, e.g., a pointer 1204 or other referenced address) and set the reachable status bits (e.g., reachable status bit 1304) of those objects as well. Similarly, the metadata manager 134 also may implement a metadata command "CLEARALL(X)" to clear the reachable status bit of the object and all recursively referenced objects. This approach would make use of a predetermined format for the layout of objects in memory, and in particular, a method to determine the size of an object and which fields contain pointers. Moreover, this approach typically would require the virtual-to-physical address translation support described above with reference to FIG. 7.

In at least one embodiment, the apparatus and techniques described above are implemented in a system comprising one or more integrated circuit (IC) devices (also referred to as integrated circuit packages or microchips), such as the stacked memory device 102 of FIGS. 1-13. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 14:
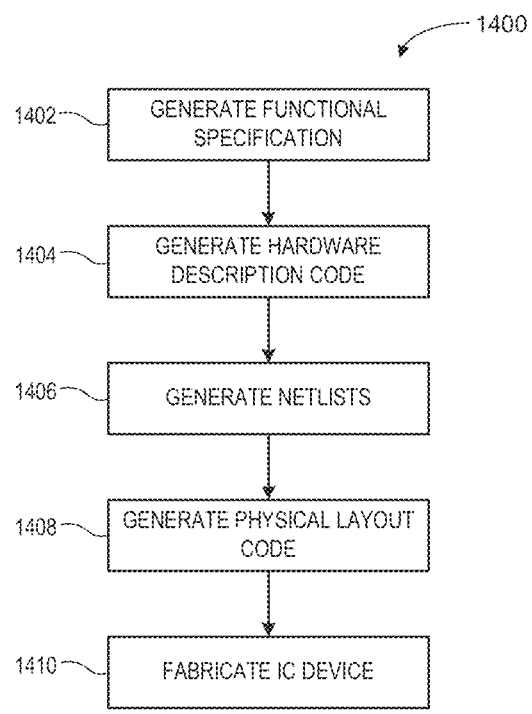
FIG. 14 is a flow diagram illustrating a method for designing and fabricating an integrated circuit (IC) device implementing a stacked memory and a metadata manager in accordance with at least one embodiment of the present disclosure.

FIG. 14 is a flow diagram illustrating an example method 1400 for the design and fabrication of an IC device implementing one or more aspects of the present invention in accordance with at least one embodiment of the present disclosure. As noted above, the code generated for each of the following processes is stored or otherwise embodied in computer readable storage media for access and use by the corresponding design tool or fabrication tool.

At block 1402 a functional specification for the IC device is generated. The functional specification (often referred to as a micro architecture specification (MAS)) may be represented by any of a variety of programming languages or modeling languages, including C, C++, SystemC, Simulink, or MATLAB.

At block 1404, the functional specification is used to generate hardware description code representative of the hardware of the IC device. In at least one embodiment, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 1406 a synthesis tool is used to synthesize the hardware description code to generate code representing or defining an initial physical implementation of the circuitry of the IC device. In one embodiment, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 1408, one or more EDA tools use the netlists produced at block 1406 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 1410, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. An integrated circuit (IC) package comprising:
    memory cell circuitry; and
    a set of one or more logic layers electrically coupled to the memory cell circuitry, the set of one or more logic layers comprising:
        a metadata manager; and
        a memory interface, the memory interface coupled to the metadata manager and coupleable to a device external to the IC package,
        the metadata manager to manage metadata stored at the IC package, wherein the metadata is associated with operational data stored at the memory cell circuitry for the device and includes at least one of:
            a memory utilization metric associated with a specified memory address range;
            memory log information representing accessed memory locations; and
            address translation information; and
        wherein the metadata manager is to perform, based on a memory address identified by a memory access request or a metadata command from the device, a metadata management operation including at least one of:
            updating the memory utilization metric;
            updating the memory log information; and
            accessing the address translation information to translate a virtual address identified by the metadata command to a physical address.

2. The IC package of claim 1, further comprising a set of stacked memory layers implementing the memory cell circuitry.

3. The IC package of claim 2, wherein:
    the metadata is stored at the memory cell circuitry; and
    the memory interface is to access the metadata from the memory cell circuitry and provide the accessed metadata to the device in response to a request from the device.

4. The IC package of claim 3, wherein:
    the metadata manager is to provide to the device a memory address of the memory cell circuitry at which the metadata is stored; and
    the request includes the memory address.

5. The IC package of claim 2, wherein the metadata is stored in at least one storage element in the set of one or more logic layers.

6. The IC package of claim 2, wherein the metadata manager is to perform at least one metadata management operation independent of signaling from the device.

7. The IC package of claim 2, wherein the set of stacked memory layers and the set of one or more logic layers are disposed in a stacked configuration whereby the memory interface is connected to the stacked memory layers via a set of through silicon vias.

8. The IC package of claim 2, wherein the set of stacked memory layers and the set of one or more logic layers are disposed in a side-split arrangement whereby the memory interface is connected to the stacked memory layers via an interposer.

9. The IC package of claim 1, wherein:
    the metadata comprises the memory utilization metric associated with the specified memory address range; and
    the metadata management operation comprises updating the memory utilization metric responsive to a match between the specified memory address range and the memory address identified by the memory access request.

10. The IC package of claim 1, wherein:
    the metadata comprises memory log information representing accessed memory locations; and
    the metadata management operation comprises updating the memory log information with the memory address identified by the memory access request.

11. The IC package of claim 1, wherein:
    the metadata comprises an error detection value associated with operational data stored at a memory address that is identified by the memory access request, the error detection value comprising at least one of a parity value, a checksum, and an error correcting code; and
    the at least one metadata management operation comprises at least one of computing or validating the error detection value using the operational data stored at the memory address.

12. The IC package of claim 1, wherein:
    the metadata comprises address translation information; and
    the metadata management operation comprises accessing the address translation information to translate the virtual address to the physical address.

13. The IC package of claim 1, wherein:
    the metadata comprises memory utilization profiling information; and the at least one metadata management operation comprises at least one of: configuring at least one parameter of a memory utilization profiling operation to be performed by the metadata manager; resetting at least one profiling metric of the memory utilization profiling information; and accessing the memory utilization profiling information for output to the device.

14. The IC package of claim 1, wherein:
the metadata comprises memory log information representing accessed memory locations; and
the at least one metadata management operation comprises at least one of: configuring at least one parameter of a memory logging operation to be performed by the metadata manager; and accessing the memory log information for output to the device.

15. The IC package of claim 1, wherein:
the metadata comprises garbage collection attributes; and
the at least one metadata management operation comprises modifying at least one of the garbage collection attributes.

16. A non-transitory computer readable medium storing code to adapt at least one computer system to perform a portion of a process to fabricate at least part of the IC package of claim 1.

17. A method comprising:
providing an integrated circuit (IC) comprising a set of stacked memory layers comprising memory cell circuitry and comprising a set of one or more logic layers electrically coupled to the set of stacked memory layers, the set of one or more logic layers comprising a metadata manager coupled to the memory cell circuitry of the set of one or more stacked memory layers and comprising a memory interface coupled to the metadata manager and coupled to a device external to the IC;
operating the memory interface to perform memory accesses for the device; and
the metadata manager managing metadata stored at the IC, wherein the metadata includes at least one of:
a memory utilization metric associated with a specified memory address range;
memory log information representing accessed memory locations; and
address translation information; and
wherein the metadata manager is to perform, based on a memory address identified by a memory access request or a metadata command from the device, a metadata management operation including at least one of:
updating the memory utilization metric,
updating the memory log information, and
accessing the address translation information to translate a virtual address identified by the metadata command to a physical address.

18. The method of claim 17, wherein the IC comprises a set of stacked memory layers implementing the memory cell circuitry.

19. The method of claim 18, wherein managing metadata comprises performing at least one metadata management operation in response to a metadata command from the device.

20. The method of claim 18, wherein the metadata is stored at the memory cell circuitry, and the method further comprises:
accessing the metadata from the memory cell circuitry and providing the accessed metadata to the device.

21. The method of claim 18, wherein the metadata is stored in at least one storage element in the set of one or more logic layers, and the method further comprises:
accessing the metadata from the at least one storage element and providing the accessed metadata to the device.

22. The method of claim 17, wherein:
the metadata comprises the memory utilization metric associated with the specified memory address range; and
the metadata management operation comprises updating the memory utilization metric responsive to a match between the specified memory address range and the memory address identified by the memory access request.

23. The method of claim 17, wherein the metadata management operation further comprises:
at least one of computing and validating an error detection value associated with operational data stored at a memory address identified by the memory access request, the error detection value comprising at least one of a parity value, a checksum, and an error correcting code.

24. The method of claim 23, wherein the metadata management operation comprises at least one of:
configuring at least one parameter of a memory utilization profiling operation to be performed by the metadata manager;
resetting at least one profile metric of a memory utilization profiling operation to be performed by the metadata manager;
configuring at least one parameter of a memory logging operation to be performed by the metadata manager;
accessing memory log information stored at the IC for output to the device; and
modifying at least one garbage collection attribute associated with the operational data.

25. The method of claim 17, wherein:
the metadata includes memory log information representing accessed memory locations; and
the metadata management operation includes updating the memory log information with the memory address identified by the memory access request.

26. The method of claim 17, wherein:
the metadata includes address translation information; and
the metadata management operation includes accessing the address translation information to translate the virtual address to the physical address.

27. A system comprising:
a stacked memory device comprising:
a set of stacked memory layers comprising memory cell circuitry; and
a set of one or more logic layers electrically coupled to the set of stacked memory layers, the set of one or more logic layers comprising,
a memory interface; and
a metadata manager to manage metadata stored at the stacked memory device, wherein the metadata includes at least one of:
a memory utilization metric associated with a specified memory address range;
memory log information representing accessed memory locations; and
address translation information; and a processor device coupled to the stacked memory device via the memory interface, the processor device to:
provide operational data for storage at the set of stacked memory; and
issue a metadata command to the stacked memory device to initiate a performance of at least one metadata management operation by the metadata manager for metadata associated with the operational data, wherein the at least one metadata management operation includes at least one of:
updating the memory utilization metric;
updating the memory log information; and
accessing the address translation information to translate a virtual address identified by the metadata command to a physical address based on a memory address identified by the metadata command from processor the device.

28. The system of claim 27, wherein the metadata is stored at the memory cell circuitry.

29. The system of claim 27, wherein the metadata is stored in at least one storage element in the set of one or more logic layers.

30. An integrated circuit (IC) comprising:
a set of one or more logic layers electrically coupleable to memory cell circuitry, the set of one or more logic layers comprising:
a metadata manager; and
a memory interface, the memory interface coupled to the metadata manager and coupleable to a device external to the IC, and
the metadata manager to manage metadata stored at the IC, wherein the metadata is associated with operational data stored at the memory cell circuitry for the device and includes at least one of:
a memory utilization metric associated with a specified memory address range;
memory log information representing accessed memory locations; and
address translation information; and
wherein the metadata manager is to perform, based on a memory address identified by a memory access request or a metadata command from the device, a metadata management operation including at least one of:
updating the memory utilization metric; updating the memory log information, and accessing the address translation information to translate a virtual address identified by the metadata command to a physical address.

31. The IC of claim 30, further comprising:
a set of stacked memory layers implementing the memory cell circuitry.

32. The IC of claim 30, wherein:
the metadata comprises the memory utilization metric associated with the specified memory address range; and
the metadata management operation comprises updating the memory utilization metric responsive to a match between the specified memory address range and the memory address identified by the memory access request.

33. The IC of claim 30, wherein:
the metadata comprises memory log information representing accessed memory locations, and the metadata management operating comprises updating the memory log information with the memory address identified by the memory access request.

34. The IC of claim 30, wherein:
the metadata comprises address translation information; and
the metadata management operating comprises accessing the address translation to translate the virtual address to the physical address.

35. A processor comprising:
a memory interface coupleable to an integrated circuit device having memory cell circuitry and one or more logic layers comprising a metadata manager; and
wherein the processor is to store operational data at the integrated circuit device and to direct the metadata manager to manage metadata associated with the stored operational data, wherein the metadata includes at least one of:
a memory utilization metric associated with a specified memory address range;
memory log information representing accessed memory locations; and
address translation information; and
wherein the metadata manager is to perform, based on a memory address identified by a memory access request or a metadata command from the processor, a metadata management operation including at least one of:
updating the memory utilization metric;
updating the memory log information; and
accessing the address translation information to translate a virtual address identified by the metadata command to a physical address.

36. The processor of claim 35, wherein:
the metadata comprises the memory utilization metric associated with the specified memory address range; and
the metadata management operation comprises updating the memory utilization metric responsive to a match between the specified memory address range and the memory address identified by the memory access request.

37. A system comprising:
a processor; and
integrated circuit (IC) separate from the processor, the IC comprising:
memory cell circuitry;
a memory interface coupled to the memory cell circuitry and coupled to the processor; and
a metadata manager coupled to memory interface, the metadata manager to manage metadata stored at the IC and which is associated with operational data stored at the memory cell circuitry for the processor, wherein the metadata includes at least one of:
a memory utilization metric associated with a specified memory address range;
memory log information representing accessed memory locations; and
address translation information; and
wherein the metadata manager is to perform, based on a memory address identified by a memory access request or a metadata command form the processor, a metadata management operation including at least one of:
updating the memory utilization metric;
updating the memory log information; and accessing the address translation information to translate a virtual address identified by the metadata command to a physical address.

38. The system of claim 37, wherein, the metadata comprises the memory utilization metric associated with the specified memory address range; and the metadata management operation comprises updating the memory utilization metric responsive to a match between the specified memory address range and the memory address identified by the memory access request.

39. The system of claim 37, wherein:

the metadata comprises memory log information representing accessed memory locations; and the metadata management operation comprises updating the memory log information with the memory address identified by the memory access request.

40. The system of claim 37, wherein the metadata manager is to perform at least one metadata management operation independent of signaling from the device.

* * * * *